(12) United States Patent
Valentine et al.

(10) Patent No.: US 11,287,642 B2
(45) Date of Patent: Mar. 29, 2022

(54) ELECTROCHEMICALLY ACTUATED OPTICAL MODULATOR

(71) Applicant: Vanderbilt University, Nashville, TN (US)

(72) Inventors: Jason G. Valentine, Nashville, TN (US); Cary L. Pint, Nashville, TN (US); Zachary J. Coppens, Nashville, TN (US); Adam P. Cohn, Nashville, TN (US)

(73) Assignee: Vanderbilt University, Nashville, TN (US)

(*) Notice: Subject to any disclaimer, the term of this patent is extended or adjusted under 35 U.S.C. 154(b) by 403 days.

(21) Appl. No.: 16/135,697

(22) Filed: Sep. 19, 2018

(65) Prior Publication Data

US 2019/0086758 A1 Mar. 21, 2019

Related U.S. Application Data

(60) Provisional application No. 62/560,427, filed on Sep. 19, 2017.

(51) Int. Cl.
| G02B 26/00 | (2006.01) |
| G02F 1/21 | (2006.01) |
| G02F 1/01 | (2006.01) |
| G02B 26/08 | (2006.01) |
| G02F 1/155 | (2006.01) |
| G02F 1/153 | (2006.01) |

(52) U.S. Cl.
CPC ......... G02B 26/001 (2013.01); G02B 26/085 (2013.01); G02F 1/0123 (2013.01); G02F 1/21 (2013.01); G02F 1/155 (2013.01); G02F 1/213 (2021.01); *G02F 2001/1536* (2013.01); *G02F 2201/083* (2013.01); *G02F 2203/02* (2013.01); *G02F 2203/055* (2013.01); *G02F 2203/15* (2013.01)

(58) Field of Classification Search
CPC .... G02F 1/21; G02F 1/19; G02F 1/165–1/25; G02B 26/001
USPC ...................... 359/315–318, 260; 372/10–17
See application file for complete search history.

(56) References Cited

U.S. PATENT DOCUMENTS 7,573,919 B2 * 8/2009 Cattelan ................. H01S 5/141
372/20
7,826,131 B2 * 11/2010 Arsenault ................. G02F 1/21
359/318

(Continued)

OTHER PUBLICATIONS

Xia, J., Ying, Y. and Foulger, S. (2005), Electric-Field-Induced Rejection-Wavelength Tuning of Photonic-Bandgap Composites. Adv. Mater., 17: 2463-2467 (Year: 2005).*

(Continued)

*Primary Examiner* — Zachary W Wilkes
(74) *Attorney, Agent, or Firm* — Meunier Carlin & Curfman LLC (57) ABSTRACT

A device according to one example of principles described herein may include a backplane, electrochemical actuator, and an optical resonator, wherein the electrochemical actuator is located between the backplane and optical resonator. Applied energy may be used to modify the volume of the electrochemical actuator material modifying the resonant/ interferometric absorption, transmission, and reflection at visible and/or infrared frequencies.

42 Claims, 4 Drawing Sheets

(56) References Cited

U.S. PATENT DOCUMENTS 8,861,072 B2 * 10/2014 Arsenault ............ G02F 1/0147
359/322
9,684,219 B2 6/2017 Garcia et al.

OTHER PUBLICATIONS

Jiayu Wan, Yue Xu, Burak Ozdemir, Lisha Xu, Andrei B. Sushkov, Zhi Yang, Bao Yang, Dennis Drew, Veronica Barone, and Liangbing Hu ACS Nano 2017 11 (1), 788-796 (Year: 2017).*

Gopalakrishnan, J and Rangan, Kasthuri K (1992) Vanadium phosphate ($V_2(PO_4)_3$): a novel NASICO N-type vanadium phosphate synthesized by oxidative deintercalation of sodium from sodium vanadium phosphate ($Na_3V_2(PO_4)_3$). In: Chemistry of Materials, 4(4). pp. 745-747 (Year: 1992).*

Manners et al., Phototonic-crystal full-color displays, Nature Phonics, vol. 1 (2007).

Cohn et al., Ultrafast Solvent-Assisted Sodium Ion Intercalation into Highly Crystalline Few-Layered Graphene, Nano Letters, 2016, Issue 16, p. 543-548.

* cited by examiner

ELECTROCHEMICALLY ACTUATED OPTICAL MODULATOR

STATEMENT REGARDING FEDERALLY SPONSORED RESEARCH

This invention was made with government support under grant N00014-16-1-2283 awarded by the Office of Naval Research and grant CMMI1400424 awarded by the National Science Foundation. The government has certain rights in this invention.

CROSS REFERENCE TO RELATED APPLICATIONS

This application is a non-provisional application of Provisional Patent Application Ser. No. 62/560,427, filed Sep. 19, 2017, which application is hereby incorporated by this reference in its entirety for all purposes as if fully set forth herein.

SUMMARY

In some aspects, the present invention relates to an electrochemically actuated optical modulator. Various aspects and features of embodiments of the present invention will become apparent to those skilled in the art upon reviewing the following detailed description. Further embodiments, features, and advantages of the present invention, as well as the structure and operation of the various embodiments, are described in detail below with reference to the accompanying drawings.

In one embodiment, an optical modulator comprises a backplane, an electrochemical actuator, and an optical resonator electromagnetically coupled to the backplane, wherein the electrochemical actuator is located between the backplane and optical resonator.

Additional advantages of the electrochemically actuated optical modulator will be set forth in part in the description which follows, and in part will be obvious from the description, or may be learned by practice of the electrochemically actuated optical modulator. Advantages of the electrochemically actuated optical modulator according to certain embodiments will be realized and attained by means of the elements and combinations particularly pointed out in the appended claims. It is to be understood that both the foregoing general description and the following detailed description are exemplary and explanatory only and are not restrictive of the present invention, as claimed.

BRIEF DESCRIPTION OF THE DRAWINGS

The accompanying drawings, which are incorporated in and constitute a part of this specification, illustrate embodiments of the present invention and, together with the description, serve to explain principles of the present invention.

DETAILED DESCRIPTION

The present description may be understood more readily by reference to the following detailed description of preferred embodiments of the present invention and the examples included therein and to the figures and their previous and following description.

As used in the specification and the appended claims, the singular forms "a," "an" and "the" include plural referents unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In some aspects, principles described herein refer to an electrochemical actuator for tuning the optical properties of a material. In some embodiments, an electrochemical actuator includes a material in proximity to an ion conducting medium, such as an electrolyte solution, where controlled reversible volumetric change or height change a desired during oxidation and reduction can be achieved. This change can be a result of intercalation reactions (e.g., graphite, few-layer graphene or $LiCoO_2$), alloying reactions (e.g., silicon, tin, aluminum, germanium, bismuth, lead, antimony), conversion reactions (e.g., sulfur, metal sulfides, metal oxides), or organic redox reactions (e.g., polyaniline) in the actuator material.

According to one embodiment of a device configuration, a material undergoing a volume change is placed between a reflector and a metal or dielectric optical resonator. Volume changes in the actuator, which are induced by applying energy, for example electrical energy, cause a shift in the resonant absorption frequency. According to another embodiment of a device configuration, volume changes in the actuator alter the interferometric reflection and/or absorption either in the presence or absence of a reflecting surface. With respect to the above-mentioned device configurations, electrochemical actuation results in a color change in the film which can be realized from visible to infrared frequencies.

Embodiments of the present invention have numerous applications, with configurations that reflect a combination of color tunability, switching speed, and energy utilization that may not be otherwise achieved in other existing configurations. In some embodiments, volume change characteristics of the material that undergoes the reduction-oxidation reaction controls the spectral window over which shifts to emission or absorption properties can be achieved. In this regard, whereas many materials and chemical reaction processes can be used, each application brings different specifications for the volume change requirements to satisfy functionality for that specific application.

Figure 1A:
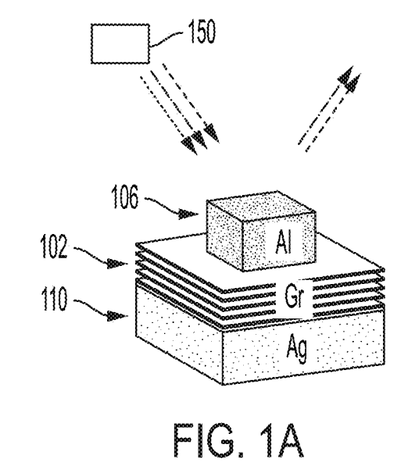
FIG. 1A and FIG. 1B illustrate a schematic of an optical modulator according to principles described herein.
Figure 1B:
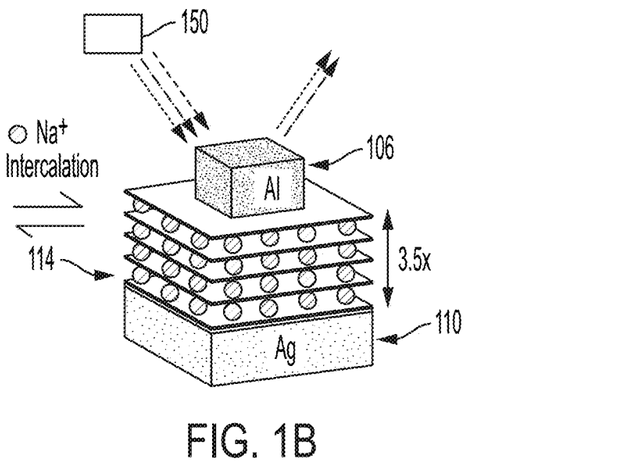
Figure 1C:
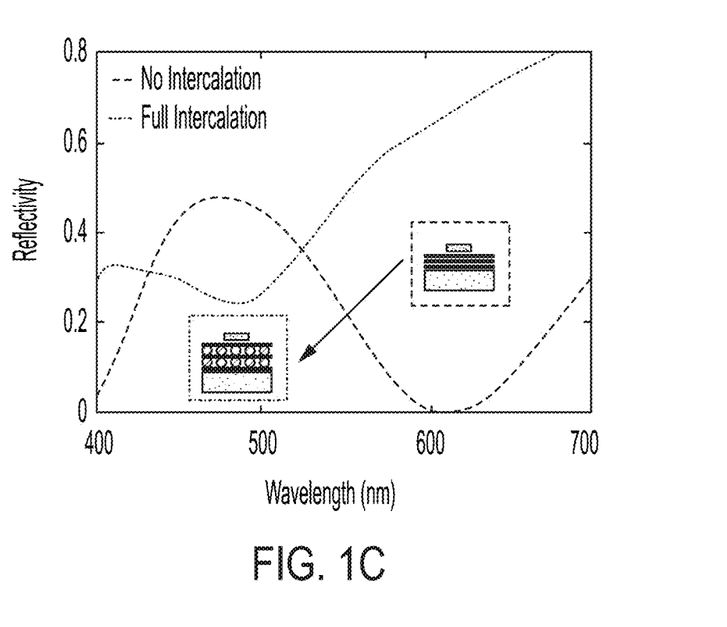
FIG. 1C shows simulated optical response of the device before and after intercalation of the sodium ions between the graphene sheets.

FIG. 1A illustrates a schematic of an optical modulator according to principles described herein. Multilayer graphene sheets 102 separate an optical resonator 106 from a substrate 110. The multilayer graphene sheets 102 are part of the electrochemical actuator. As illustrated, the substrate 110 is made of silver and the optical resonator 106 is made of Aluminum, but the principles described herein may be applicable to other materials. In the presently described embodiment, sodium ions 114 are controlled to intercalate between the graphene sheets 102, as illustrated in FIG. 1B. FIG. 1C shows a simulated optical response of the device before and after intercalation of the sodium ions 114 between the graphene sheets 102.

Figure 2:
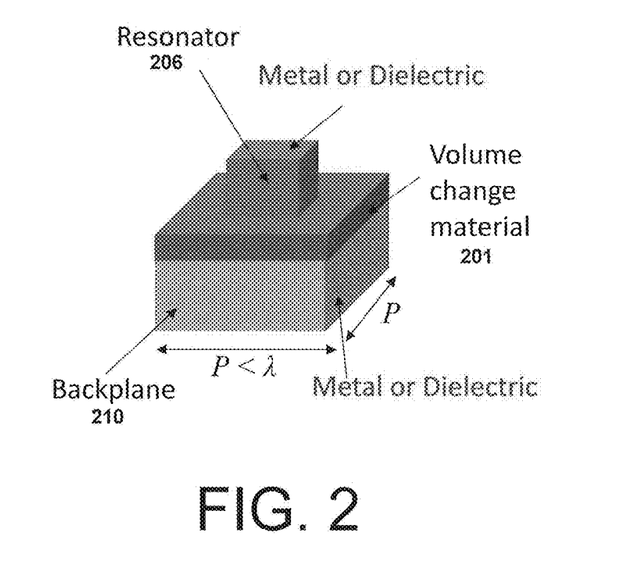
FIG. 2 is a schematic illustration of a "unit cell" of a device structure according to principles described herein.

FIG. 2 is a schematic illustration of a "unit cell" of a device structure according to principles described herein. "Unit cell" refers to the smallest building block of the material. Unit cell geometry is not necessarily uniform of a device comprising multiple unit cells.

As shown in FIG. 2, a volume change material 201 (e.g., changeable by intercalation as described above) is formed on a backplane or substrate 210, which may be a metal or dielectric or the like. The backplane 210 may include electronic circuitry (not shown) for addressing the unit cell. An optical resonator 206 is formed on the volume change material 201. An aspect illustrated in FIG. 2 is uniform volume change material. The backplane 210 can be either continuous or broken between unit cells or groups of unit cells. A broken backplane would be used for unit cell level electrical addressing. In an aspect, unit cells can be grouped for electrical addressing of the group of cells rather than at the individual unit cell level. Although a volume change is illustrated in the presently described embodiment, expansion or contraction in the z-direction alone is sufficient to cause a change in interferometric absorption, transmission and/or reflection according to principles described herein in any embodiment described herein. Metal as used herein refers to any material with an electrical permittivity less than zero at the wavelengths of operation. Dielectric as used herein refers to any material that possesses a bandgap.

The shape of the optical resonator 206 may be chosen to exhibit an optical resonance at a wavelength of interest $\lambda$. Possible geometries include, but not limited to, cubes, cuboid, cylinders, trapezoidal prisms, and spheres. The unit cell period P at any point in the device may be less than the wavelength $\lambda$. The volume change material 201 may be chosen based on actuation speed. Although not shown, the volume change material 201 may be coated with a thin metal or dielectric or may remain uncoated.

Figure 3:
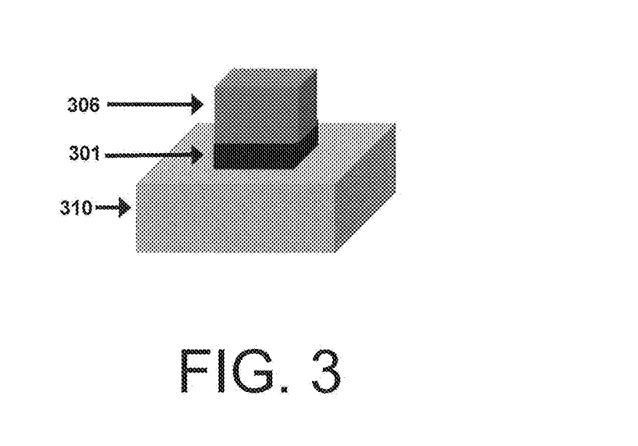
FIG. 3 illustrates a unit cell in which change material on the backplane has been structured or shaped to allow for a desired actuation speed.

FIG. 3 illustrates a unit cell in which the volume change material 301 on the backplane 310 has been structured or shaped to allow for a desired actuation speed. In the illustrated unit cell, the volume change material 301 has been sized to have a similar footprint to the optical resonator 306, but the structure of the volume change material 301 is not so limited.

A device according to principles described herein may include a backplane, electrochemical actuator, and an optical resonator, wherein the electrochemical actuator is located between the backplane and optical resonator. The application of energy, for example electrical energy (e.g., current and/or voltage), is used to modify the volume of the electrochemical actuator material modifying the resonant/interferometric absorption, transmission, and reflection at visible and/or infrared frequencies. The backplane may be a metal, thin metal film, or dielectric, for example. Metal in this case refers to any material with an electrical permittivity less than zero at the wavelengths of operation. Dielectric in this case refers to any material that possesses a bandgap. A dielectric material may be placed between the backplane and actuator material and/or between the resonator and actuator material.

The resonator may be a metal or dielectric. Metal in this case refers to any material with an electrical permittivity less than zero at the wavelengths of operation. Dielectric in this case refers to any material that possesses a bandgap. The resonator possesses one or more optical resonances and electromagnetic coupling between the resonator and backplane allows the resonance(s) to be modified. The electrochemical actuator material may be structured to enhance diffusion of intercalants, increasing switching speed. A volume change in the electrochemical actuator may be used to tune the resonant absorption frequency across the IR or visible spectrum for applications in subtractive color reflective displays and/or in additive reflective displays.

The backplane may be either a metal or dielectric. Metal in this case refers to any material with an electrical permittivity less than zero at the wavelengths of operation. The electrochemical actuator material may be structured to enhance diffusion of intercalants, increasing switching speed. A volume change is used to tune the absorption, and thus thermal emission, in the infrared region for applications in thermal signature control. It is observed that the volume changes modify the electromagnetic coupling between the resonator and the backplane, thus changing optical resonance. The volume change may be provided by intercalation of ions in the electrochemical actuator, for example, by intercalation of sodium ions in graphene sheets.

The optical resonator may be fabricated using any appropriate technique, including using parallel, top down or bottom up processes (e.g., nanoimprint lithography, solid-state dewetting, self-assembly, template-assisted deposition). A thin metal film may be placed on the electrochemical actuator, opposite the backplane, creating a Salisbury screen. The electrochemical actuator may include a material that undergoes reversible volumetric change during oxidation and reduction such as materials that store metal ions through intercalation reactions (e.g., graphite, few-layer graphene or $LiCoO_2$), alloying reactions (e.g., silicon, tin, aluminum, germanium, bismuth, lead, antimony), conversion reactions (e.g., sulfur, metal sulfides, metal oxides), or organic redox reactions (e.g., polyaniline). One electrode may serve as a metal ion source (e.g., sodium metal, lithium metal, sodium vanadium phosphate, lithium iron phosphate, Prussian blue). Two electrodes may be in contact with an electrolyte with an ionic conductivity greater than $1\times10^{-9}$ S/cm at 20° C. The electrolyte may be a liquid electrolyte having a salt dissolved in an organic solvent or water; a polymer electrolyte having a salt dissolved in a polymer with or without a solvent; or a solid inorganic electrolyte having an ionically conducting ceramic or glass. The electrolyte may comprise a 0.1M to 1M concentration of solution of $NaPF_6$ dissolved into bis(2-methoxyethyl). The backplane is electrically isolated between unit cells or groups of unit cells to provide for pixel-level actuation. The electrochemical actuation modifies the spontaneous emission frequency of a near-by optical emitter 150 150 (FIGS. 1A and 1B) (light emitting diode, quantum dot, fluorophore, etc.). The electrochemical actuation modifies the lasing frequency of a near-by optical emitter 150 (FIGS. 1A and 1B) (light emitting diode, quantum dot, fluorophore, etc.). In some instances, an optical modulator device according to principles described herein can consume less than 1 $mW/cm^2$ of power with less than a 5 second switching time.

Figure 4A:
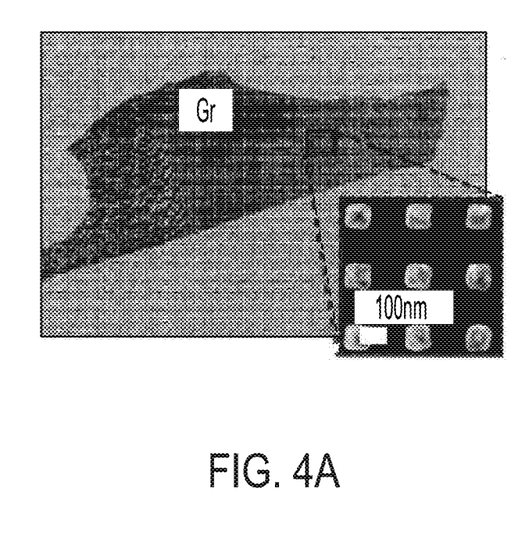
FIG. 4A shows a scanning electron microscope (SEM) image of an exemplary device fabricated according to principles described herein.
Figure 4B:
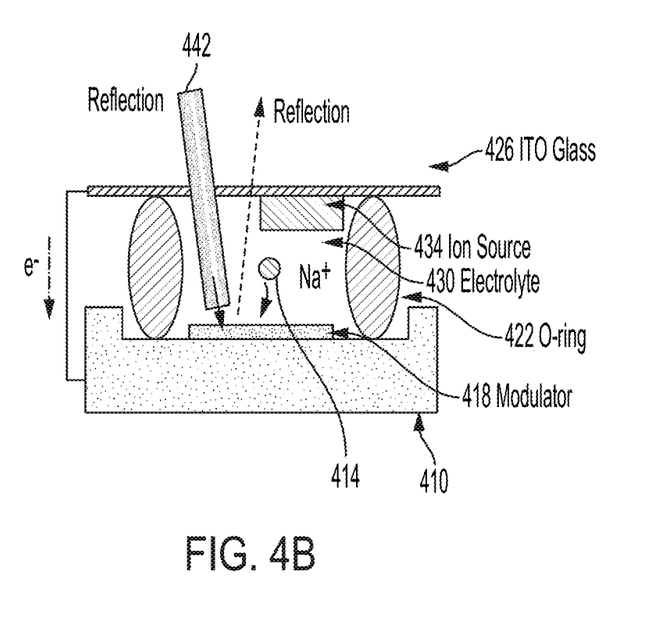
FIG. 4B is a schematic of an electrochemical cell used for actuating in the example shown in FIG. 4A.
Figure 4C:
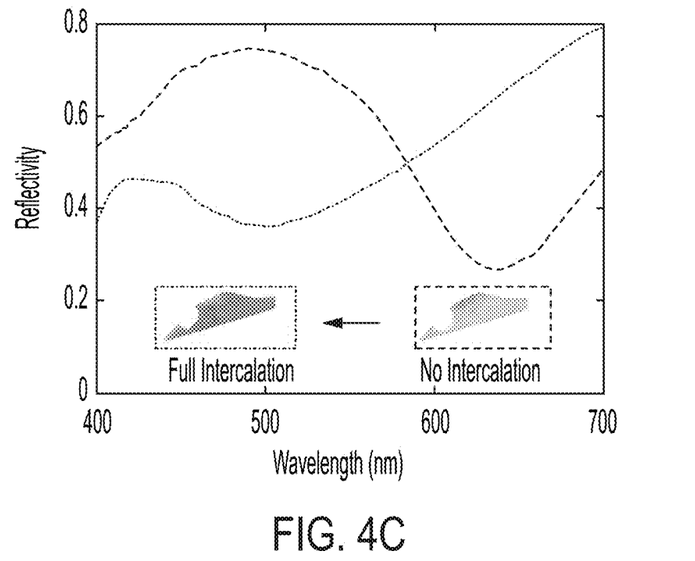
FIG. 4C shows experimental reflection spectra with and without co-intercalation.

FIG. 4A shows a scanning electron microscope (SEM) image of an exemplary device fabricated according to principles described herein. FIG. 4B is a schematic of an electrochemical cell used for actuating in the example shown in FIG. 4A. FIG. 4C shows experimental reflection spectra with and without co-intercalation. In the device shown in FIG. 4A, co-intercalation allows solvent (electrolyte) to enter between the graphene sheets with the sodium ions, i.e., the solvent shell moves with the ions.

As shown in FIG. 4B, a modulator 418 comprises an array of unit cells corresponding to those depicted in FIG. 2. Each unit cell comprises an optical resonator and the electrochemical actuation material which rests on a backplane/substrate 410. A transparent material 426 such as Indium Tin Oxide (ITO) or glass is separated from the backplane/substrate 410 by at least one O-ring or other separator 422. A solvent 430 is provided between the transparent material 426 and the backplane/substrate 410. An ion source 434 is also provided between the transparent material 426 and the backplane/substrate 410. The ion source 434 is controllable to release ions 414 into the solvent 430, for example, by application of voltage or current to an electrode 438 coupled to the ion source 434. In the example structure, the ion source 434 is provided on the transparent material 426 with the electrode 438 therebetween, although an optical modulator according to principles described herein is not limited to such structure. The electrode 438 itself may be the ion source.

As illustrated in FIG. 4B, light 442 enters the optical modulator through the transparent material 426. Light 442 entering the device passes through the solvent 430 to reach the modulator (not shown in FIG. 4B) and is reflected by the modulator through the transparent material 426. The resonance in the modulator results in spectrally selective absorption, reflection and transmission. The wavelength of the reflected or absorbed light is controllable by application of a voltage or current to the electrode 438 to cause sodium ions 414 to enter solution with the solvent 430 and intercalate with the graphene sheets of the electrochemical actuator, as illustrated in FIG. 1B.

In an aspect of the device according to principles described herein, the graphene sheets are placed at one of two electrodes in the unit cell or group of unit cells. Intercalants cause expansion in the z-directions (e.g. in a direction perpendicular to the surface of the graphene sheets, such as perpendicular to the backplane). In some examples, the intercalants may cause an expansion in the range of 3.5× the original height of the graphene sheet stack. Solvent-assisted intercalation, which is but one of the mechanisms of intercalation contemplated herein, can act on a milllisecond scale and provide long-term stability to the bi-stable device. Intercalation may not occur simultaneously for every graphene sheet. Applied voltage controls the stage number (e.g., the degree of intercalation.) Although a volume change is illustrated in the presently described embodiment, expansion or contraction in the z-direction alone is sufficient to cause a change in interferometric absorption, transmission and/or reflection according to principles described herein in any embodiment described herein.

The following discusses some non-limiting examples of implementing aspects and embodiments of the present invention. One example implementation relates to optical displays, to shift the optical absorption or emission frequency of a resonator structure across the whole visible light spectrum (450 nm-650 nm). To accommodate this, the actuating material undergoes a volume change that alters the separation distance between the reflecting surface and metal or dielectric resonator.

Figure 5:
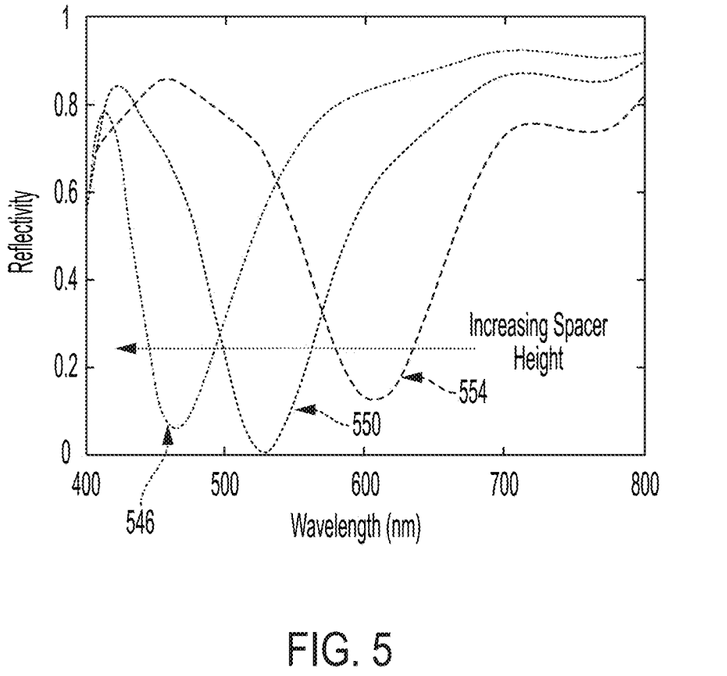
FIG. 5 illustrates the effect of spacer height on wavelength.

FIG. 5 is the reflectivity as a function of wavelength and illustrates the effect of spacer height on the reflection spectrum. The Yellow 546, Magenta 550 and Blue 554 curves represent the reflection spectra as a function of the spacer height and would yield the corresponding colors if viewed in reflection. The spacer height can be smoothly varied through staging of the graphene layers allowing for intermediate colors.

Another example implementation relates to reconfigurable or adaptive devices. Such implementations can include (i) color-changing camouflage, (ii) infrared identification systems (infrared tags) or infrared camouflage, and (iii) optical signatures or other virtual objects that can be modulated by changing the emission or absorption frequency. In such systems, emission or absorption over a smaller frequency range may be acceptable to perform the function of the device. These implementations provide for materials with volume change characteristics greater than 5% to be capable of optical modulation in a manner that is device specific. For instance, the requirement to shift the color of a camouflage material from light green to dark green requires a significantly lower volume change than a system where the volume change must accommodate emission/absorption shifts over the whole visible or wide-band spectrum.

Another example implementation relates to rapidly tunable coherent emission. In some embodiments, a device architecture can be used in the context of coherent emission to provide a tunable laser that does not suffer from the size limitations of conventional tunable laser systems, such as dye-lasers, and can switch frequencies at high rates between 5 milliseconds to a few seconds compared to existing tunable laser technology that requires thermal energy input to enable spectral tuning. These embodiments can benefit from optical resonators designed with a variety of different volume change materials ranging from low volume change (e.g. 5-25%) which can provide for fine tuning of a laser frequency around a single wavelength, or high-volume change (150%-400%), which can provide for tuning of a laser over the whole visible range (or similarly across broadband frequency ranges in the infrared or terahertz wavelength range).

According to principles described herein, a bi-stable optical modulator is provided. Accordingly, applications such as low-power bistable reflective displays, adaptive camouflage, infrared signal control and tunable light sources, may incorporate the bi-stable optical modulator.

As mentioned in some detail above, implementations of the present invention in accordance with various aspects and embodiments disclosed herein have numerous practical applications, which include, but are not limited to: reflective visible displays for electronic devices such as watches, e-readers, small and large format advertising, dynamic pictures, and wall coatings; reconfigurable filters in the visible through far infrared spectral regions; adaptive camouflage in the visible through far infrared spectral regions; and wavelength tunable light sources, including lasers, in the visible through infrared spectral regions.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical resonator, comprising:
a backplane,
a separator on the backplane;
a transparent material spaced from the backplane by the separator;
a solvent in a volume defined by the backplane, the separator, and the transparent material;
an ion source between the substrate and the transparent material;
an electrode operatively coupled to the ion source;
an electrochemical actuator comprising multilayer graphene sheets, wherein ions of the ion source are controllable by the application of energy to the electrode to cause a reversible state of intercalation of the ions between sheets of the multilayer graphene sheets to cause a volume change in the electrochemical actuator, and a patterned film on the electrochemical actuator and electromagnetically coupled to the backplane,
wherein the electrochemical actuator is located between the backplane and transparent material, such that a distance between an upper surface of the electrochemical actuator and the transparent material changes with the volume change in the electrochemical actuator.

2. The optical resonator of claim 1, further comprising a patterned film on the electrochemical actuator electromagnetically coupled to the backplane, wherein the application of energy to the electrochemical actuator modifies electromagnetic coupling of the patterned film and the backplane.

3. The optical resonator of claim 2 wherein modification of the electromagnetic coupling of the patterned film and the backplane changes a resonance frequency.

4. The optical resonator of claim 3, wherein the resonance frequency is changeable by modifying at least one of resonant absorption, transmission, and reflection with the application of energy.

5. The optical resonator of claim 3, wherein the resonance frequency is in the visible frequency band.

6. The optical resonator of claim 3, wherein the resonance frequency is in the infrared frequency band.

7. The optical resonator of claim 3, wherein the resonance frequency is in the ultraviolet frequency band.

8. The optical resonator of claim 2, wherein the application of energy changes a height of the electrochemical actuator to adjust the distance between the patterned film and the backplane to modify the electromagnetic coupling of the patterned film and the backplane.

9. The optical resonator of claim 2, wherein the application of the energy causes the volume of the electrochemical actuator to increase.

10. The optical resonator of claim 9, wherein the volume increase is in a direction substantially perpendicular to a planar surface of the backplane.

11. The optical resonator of claim 2, wherein the patterned film comprises at least one of a metal and a dielectric.

12. The optical resonator of claim 2, wherein the patterned film comprises a material with an electrical permittivity less than zero.

13. The optical resonator of claim 2, wherein the patterned film comprises one or more optical resonances, and electromagnetic coupling between the patterned film and backplane allows the resonances to be modified.

14. The optical resonator of claim 2, wherein the electrochemical actuator comprises a material structured to improve a degree of diffusion of intercalants between the sheets of the multilayer graphene sheets over a degree of diffusion of the intercalants over the electrochemical actuator without the material.

15. The optical resonator of claim 2, wherein a height change is used to tune resonant absorption frequency of the patterned film across the visible spectrum for applications in subtractive color reflective displays.

16. The optical resonator of claim 2, wherein a dielectric material is placed one of between the backplane and the electrochemical actuator and between the patterned film and the electrochemical actuator.

17. The optical resonator of claim 2, comprising a metal film on the electrochemical actuator, opposite the backplane.

18. The optical resonator of claim 2, wherein the backplane is one of a metal and a dielectric.

19. The optical resonator of claim 2, wherein the backplane comprises a material having an electrical permittivity less than zero.

20. The optical resonator of claim 2, wherein the electrochemical actuator comprises a material structured to improve a degree of diffusion of intercalants between the sheets of the multilayer graphene sheets over a degree of diffusion of the intercalants over the electrochemical actuator without the material.

21. The optical resonator of claim 2 wherein a change in volume of the electrochemical actuator changes absorption of the patterned film in the infrared region for applications in thermal signature control.

22. The optical resonator of claim 2, wherein the energy comprises electrical energy.

23. The optical resonator of claim 1, wherein the backplane comprises at least one of a metal, a metal film, and a dielectric.

24. The optical resonator of claim 1, wherein the backplane comprises a material with an electrical permittivity less than zero.

25. The optical resonator of claim 1, wherein a height change is used to tune resonant reflection frequency across the visible spectrum for applications in additive color reflective displays.

26. The optical resonator of claim 1, wherein the electrochemical actuator comprises a material that undergoes reversible volumetric change during oxidation and reduction.

27. The optical resonator of claim 26, wherein the material that undergoes reversible volumetric change stores metal ions through at least one of intercalation reactions, alloy reactions, conversion reactions, and organic redox reactions.

28. The optical resonator of claim 27, wherein the intercalation reactions comprise at least one of graphite, few-layer graphene, and $LiCoO_2$.

29. The optical resonator of claim 27, wherein the alloying reactions comprise at least one of silicon, tin, aluminum, germanium, bismuth, lead, and antimony.

30. The optical resonator of claim 27, wherein the conversion reactions include at least one of sulfur, metal sulfides, and metal oxides.

31. The optical resonator of claim 27, wherein the organic redox reactions comprise polyaniline.

32. The optical resonator of claim 1, wherein the ion source is an electrode.

33. The optical resonator of claim 1, wherein the electrode comprises one of sodium metal, lithium metal, or other compound containing lithium or sodium that allows the reversible electrochemical removal and addition of sodium metal or lithium metal.

34. The optical resonator of claim 33 wherein the electrode comprises sodium vanadium phosphate.

35. The optical resonator of claim 1, comprising two electrodes in contact with the solvent, wherein the solvent is an electrolyte with an ionic conductivity greater than $1\times10^{-9}$ S/cm at 20° C.

36. The optical resonator of claim 35, wherein the electrolyte comprises a 0.1M to 1M concentration of solution of $NaPF_6$ dissolved into bis(2-methoxyethyl).

37. The optical resonator of claim 1, wherein the solvent is an electrolyte associated with the electrochemical actuator, the electrolyte comprising a liquid electrolyte having one of a salt dissolved, a polymer electrolyte having a salt dissolved in a polymer, and a solid inorganic electrolyte having an ionically conducting material.

38. The optical resonator of claim 1, wherein the backplane is electrically isolated between unit cells to provide for pixel-level actuation.

39. The optical resonator of claim 1, wherein electrochemical actuation modifies spontaneous emission frequency of an adjacent optical emitter.

40. The optical resonator of claim 1, wherein electrochemical actuation modifies a lasing frequency of an adjacent optical emitter.

41. The modulator resonator of claim 1, wherein the intensity of energy consumed is less than 1 $mW/cm^2$ with a switching time of less than 5 seconds.

42. The optical resonator of claim 1, wherein the ion source is on the transparent material in the volume.

* * * * *